US012265158B2

(12) United States Patent
Wang et al.

(10) Patent No.: US 12,265,158 B2
(45) Date of Patent: Apr. 1, 2025

(54) MAGNETIC SENSING FOR A POLYGON MIRROR USING A HALL SENSOR FOR LIDAR SYSTEM

(71) Applicant: BEIJING VOYAGER TECHNOLOGY CO., LTD., Beijing (CN)

(72) Inventors: Youmin Wang, Berkeley, CA (US); Yufeng Wang, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 1015 days.

(21) Appl. No.: 17/238,071

(22) Filed: Apr. 22, 2021

(65) Prior Publication Data
US 2022/0342076 A1    Oct. 27, 2022

(51) Int. Cl.
*G01S 17/931*   (2020.01)
*G01D 5/14*   (2006.01)
(Continued)

(52) U.S. Cl.
CPC .......... *G01S 17/931* (2020.01); *G01S 7/4817* (2013.01); *G01S 7/484* (2013.01); *G02B 26/121* (2013.01); *H02K 11/215* (2016.01); *G01D 5/145* (2013.01)

(58) Field of Classification Search
CPC ...... G01S 17/931; G01S 7/4817; G01S 7/484; G02B 26/121; G02B 26/122; H02K 11/215; G01D 5/145
(Continued)

(56) References Cited

U.S. PATENT DOCUMENTS 5,313,053 A * 5/1994 Koenck ..................... H04L 9/40
235/472.02
5,834,753 A * 11/1998 Danielson ........... H04M 1/0202
235/472.01
(Continued)

FOREIGN PATENT DOCUMENTS

KR   20200139964 A   12/2020
KR   20200143049 A   12/2020

OTHER PUBLICATIONS

International Search Report issued in corresponding International Application No. PCT/US2021/062272, mailed Mar. 25, 2022, 4 pages.
(Continued)

*Primary Examiner* — Christopher P McAndrew
(74) *Attorney, Agent, or Firm* — BAYES PLLC

(57) ABSTRACT

Embodiments of the disclosure provide magnetic sensing systems and methods for a polygon scanner. An exemplary magnetic sensing system includes a disc permanent magnet configured to provide a magnetic field. The magnetic sensing system further includes a Hall sensor configured to generate a voltage proportional to the strength of the magnetic field as the Hall sensor and the disc permanent magnet move relatively to each other when the polygon mirror rotates. One of the disc permanent magnet and the Hall sensor locates on and rotates with the polygon mirror and the other locates off the polygon mirror. The magnetic sensing system also includes at least one controller configured to determine a rotation angle of the polygon mirror based on the generated voltage by the Hall Sensor.

20 Claims, 9 Drawing Sheets

(51) Int. Cl.
    *G01S 7/481*     (2006.01)
    *G01S 7/484*     (2006.01)
    *G02B 26/12*     (2006.01)
    *H02K 11/215*     (2016.01)

(58) Field of Classification Search
    USPC .................................................... 324/207.2
    See application file for complete search history.

(56) References Cited

U.S. PATENT DOCUMENTS

| | | | |
|---|---|---|---|
| 5,892,971 A * | 4/1999 | Danielson | H01Q 1/242 |
| | | | 710/7 |
| 5,914,481 A * | 6/1999 | Danielson | G06F 3/04886 |
| | | | 235/462.15 |
| 6,149,062 A * | 11/2000 | Danielson | G06K 7/1098 |
| | | | 235/472.01 |
| 2007/0007353 A1 * | 1/2007 | Danielson | G06K 7/10881 |
| | | | 235/462.46 |
| 2019/0383912 A1 | 12/2019 | Kim et al. | |
| 2020/0025928 A1 | 1/2020 | Gaalema | |
| 2020/0124724 A1 | 4/2020 | Jeong et al. | |

OTHER PUBLICATIONS

Written Opinion of the International Searching Authority issued in corresponding International Application No. PCT/US2021/062272, mailed Mar. 25, 2022, 4 pages.

* cited by examiner

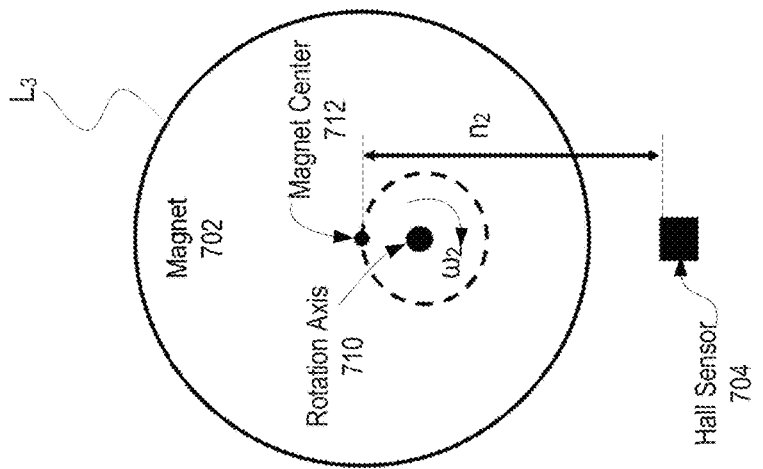
FIG. 7C
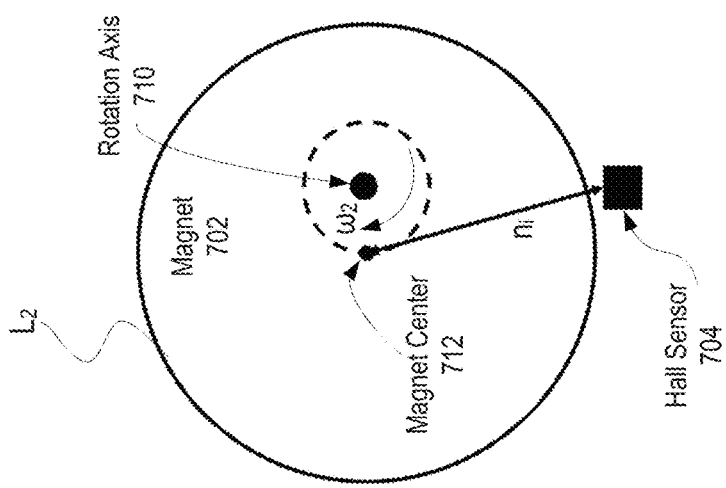
FIG. 7B
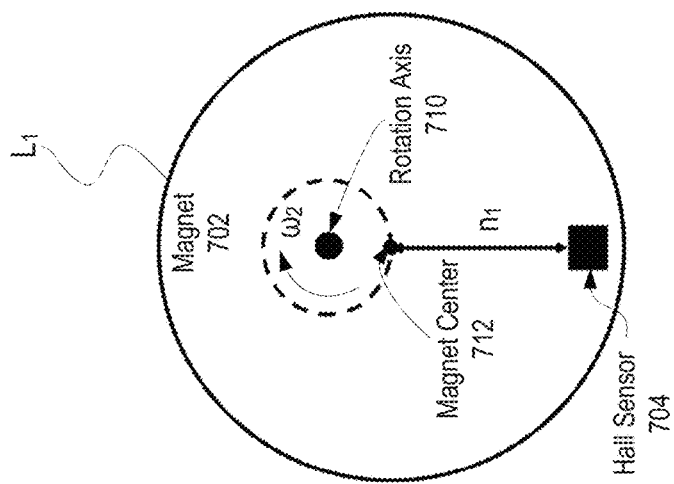
FIG. 7A
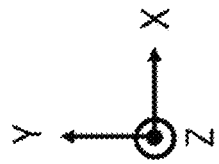

MAGNETIC SENSING FOR A POLYGON MIRROR USING A HALL SENSOR FOR LIDAR SYSTEM

TECHNICAL FIELD

The present disclosure relates to systems and methods for magnetically sensing an angular position of a scanner in light detection and ranging (LiDAR) systems, and more particularly to, systems and methods for magnetically sensing an angular position of a polygon mirror using the Hall Sensor in real-time during mechanical LiDAR scanning.

BACKGROUND

LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

Optical components used in mechanical LiDAR systems (hereafter also referred to as "LiDAR systems") may include a polygon mirror that can be rotated by a motor to reflect (and steer) laser beams to an environment. For example, the polygon mirror can be used in a LiDAR transmitter to form a polygon scanner that steers laser beams from a laser source towards a range of directions in order to scan a field of view (FOV). Because the LiDAR systems may desire a higher resolution around the center of each scan, the polygon scanner may be designed to scan at a slower speed (e.g., the polygon mirror rotates slower) in the middle of the scanning range. To achieve the desired scan resolution, it is beneficial to accurately sense the actual angular position (e.g., rotation angle, or also known as scanning angle) of the polygon mirror in real-time so that adaptive feedback control can be provided to adjust the scanning speed of the polygon scanner.

Embodiments of the disclosure address the above problems by providing magnetic sensing systems and methods for real-time sensing of the angular position of the polygon mirror used in mechanical LiDAR systems using a Hall sensor and a disc permanent magnet.

SUMMARY

Embodiments of the disclosure provide a magnetic sensing system for a polygon mirror. An exemplary magnetic sensing system includes a disc permanent magnet configured to provide a magnetic field. The magnetic sensing system further includes a Hall sensor configured to generate a voltage proportional to the strength of the magnetic field as the Hall sensor and the disc permanent magnet move relatively to each other when the polygon mirror rotates. One of the disc permanent magnet and the Hall sensor locates on and rotates with the polygon mirror and the other locates off the polygon mirror. The magnetic sensing system also includes at least one controller configured to determine a rotation angle of the polygon mirror based on the generated voltage by the Hall Sensor.

Embodiments of the disclosure also provide a magnetic sensing method for a polygon mirror. An exemplary magnetic sensing method includes moving a disc permanent magnet and a Hall sensor relative to each other as the polygon mirror rotates. One of the disc permanent magnet and the Hall sensor locates on and rotates with the polygon mirror and the other locates off the polygon mirror. The magnetic sensing method further includes measuring a voltage generated by the Hall sensor caused by the relative movement. The magnetic sensing method also includes determining, by at least one controller, a rotation angle of the polygon mirror based on the voltage generated by the Hall sensor.

Embodiments of the disclosure further provide a polygon scanner assembly. An exemplary polygon scanner assembly includes a polygon mirror configured to rotate around a rotation axis. The polygon scanner assembly further includes a disc permanent magnet configured to provide a magnetic field. The polygon scanner assembly also includes a Hall sensor configured to generate a voltage proportional to the strength of the magnetic field as the Hall sensor and the disc permanent magnet move relatively to each other when the polygon mirror rotates. One of the disc permanent magnet and the Hall sensor locates on and rotates with the polygon mirror and the other locates off the polygon mirror.

It is to be understood that both the foregoing general description and the following detailed description are exemplary and explanatory only and are not restrictive of the invention, as claimed.

BRIEF DESCRIPTION OF THE DRAWINGS

FIGS. 7A-7C each illustrates a schematic diagram of another exemplary magnetic sensing system having a disc permanent magnet rotating along with a polygon mirror and a fixed Hall sensor, according to some embodiments of the disclosure.

DETAILED DESCRIPTION

Figure 1:
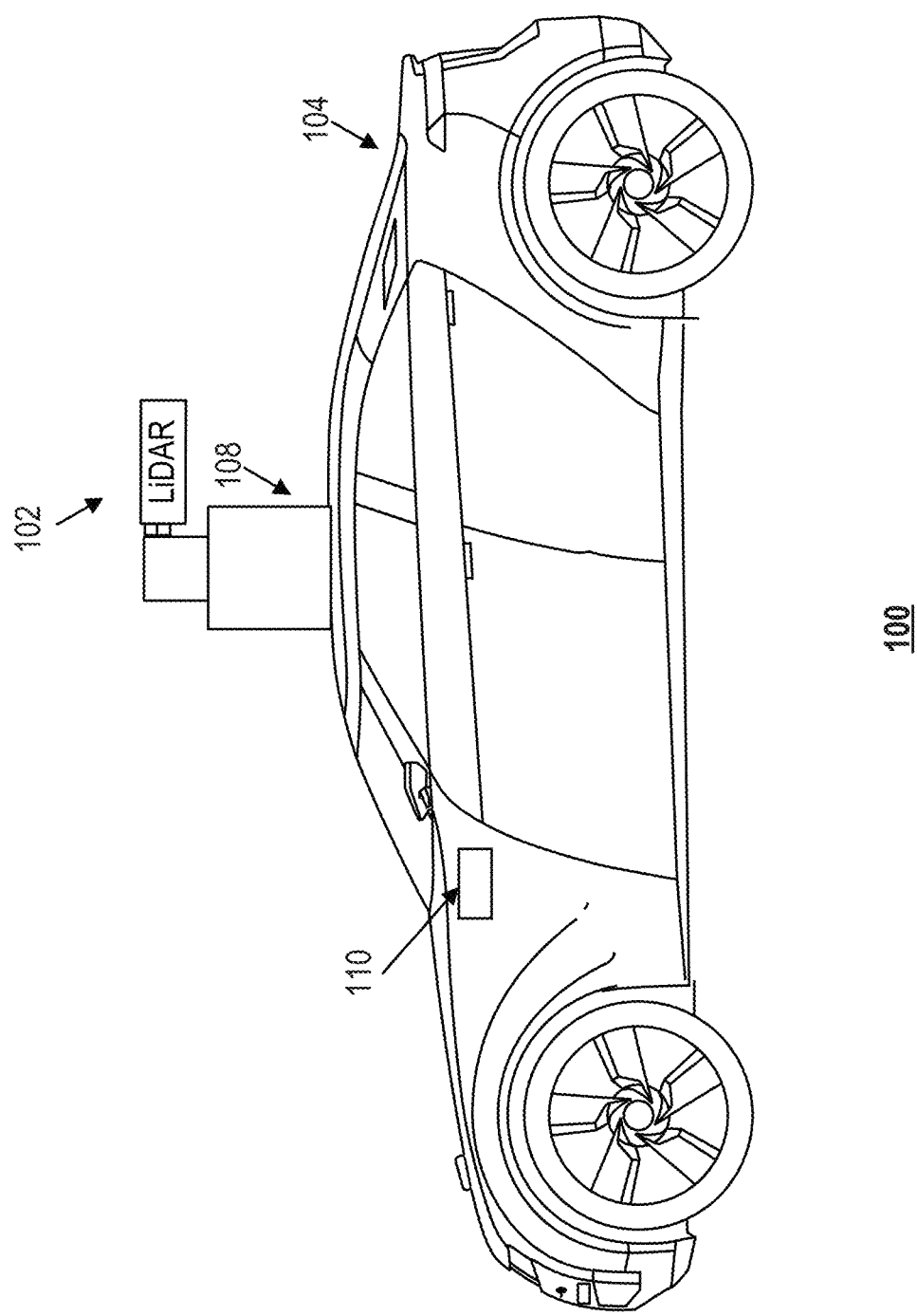
FIG. 1 illustrates a schematic diagram of an exemplary vehicle equipped with a LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide magnetic sensing systems and methods for sensing an angular position of a polygon mirror used in mechanical LiDAR systems. In some embodiments, the magnetic sensing system may include a disc permanent magnet, a Hall sensor, and at least one controller. The Hall sensor, also known as Hall-effect sensor, is a device to measure the strength of a magnetic field provided by the disc permanent magnet. An output voltage of the Hall sensor is directly proportional to the strength of the magnetic field through the Hall sensor. In some embodiments, the disc permanent magnet is mounted on the polygon mirror to move along with the polygon mirror when the polygon mirror rotates, and the Hall sensor locates off the polygon mirror. In some alternative embodiments, the Hall sensor is mounted on the polygon mirror and rotates with the polygon mirror while the disc permanent magnet locates off the polygon mirror. In both these embodiments, when the polygon mirror rotates, the Hall sensor moves relatively to the disc permanent magnet and generates a voltage that is proportional to the strength of the magnetic field through the Hall sensor.

To implement a closed-loop feedback control to control the movement of the polygon mirror, the rotation angle of the polygon mirror has to be accurately measured in real-time. In some embodiments, the controller may determine a real-time angular position (e.g., rotation angle) of the polygon mirror based on the voltage generated by the Hall sensor. For example, the controller may receive an electrical signal (e.g., a voltage) from the Hall sensor at a time point. A value and a variation trend or rate of the value of the strength of the magnetic field through the Hall sensor at the time point can be determined based on the received electrical signal. The controller may further determine a rotation angle of the polygon mirror based on a combination of the value and the variation trend or rate of the strength of the magnetic field at the time point using a predetermined look-up table that maps the respective values and the variation trends or rates of the value of the strength of the magnetic field to rotation angles of the polygon mirror. In some embodiments, the controller may adaptively control one or more motors to drive the polygon mirror to rotate based on this rotation angle sensed in real-time. For example, the controller may compare the determined angular position of the polygon mirror with a target rotation angle at the time point. The controller may further supply a control signal to the motor to speed up or slow down the rotation of the polygon mirror based on the comparison.

The features and advantages described herein are not all-inclusive and many additional features and advantages will be apparent to one of ordinary skill in the art in view of the figures and the following descriptions.

The LiDAR system containing the disclosed magnetic sensing systems and methods for the polygon mirror can be used in many applications. For example, the LiDAR system can be used in advanced navigation technologies, such as to aid autonomous driving or to generate high-definition maps, in which the LiDAR system can be equipped on a vehicle or an airplane. It is contemplated that the application of the disclosed magnetic sensing systems and methods is not limited to the LiDAR systems. For example, the disclosed magnetic sensing systems and methods can be used for sensing the angular position of a polygon mirror in a polygon scanner used in medical applications such as skin treatment and retinal scanning. Further, the disclosed magnetic sensing systems and methods for the polygon mirror may be used in many other applications such as printing, marking and coding, metrology, material processing, additive manufacturing technologies, and agricultural sorting.

FIG. 1 illustrates a schematic diagram of an exemplary vehicle 100 equipped with an optical sensing system (e.g., a LiDAR system) 102 (hereinafter also referred to as LiDAR system 102), according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with a pulsed laser beam and measuring the reflected/scattered pulses with a receiver. The laser beam used for LiDAR system 102 may be ultraviolet, visible, or near infrared, and may be pulsed or continuous wave laser beams. In some embodiments of the present disclosure, LiDAR system 102 may capture point clouds including depth information of the objects in the surrounding environment, which may be used for constructing a high-definition map or 3-D buildings and city modeling. As vehicle 100 moves along the trajectory, LiDAR system 102 may continuously capture data including the depth information of the surrounding objects (such as moving vehicles, buildings, road signs, pedestrians, etc.) for map, building, or city modeling construction.

Figure 2:
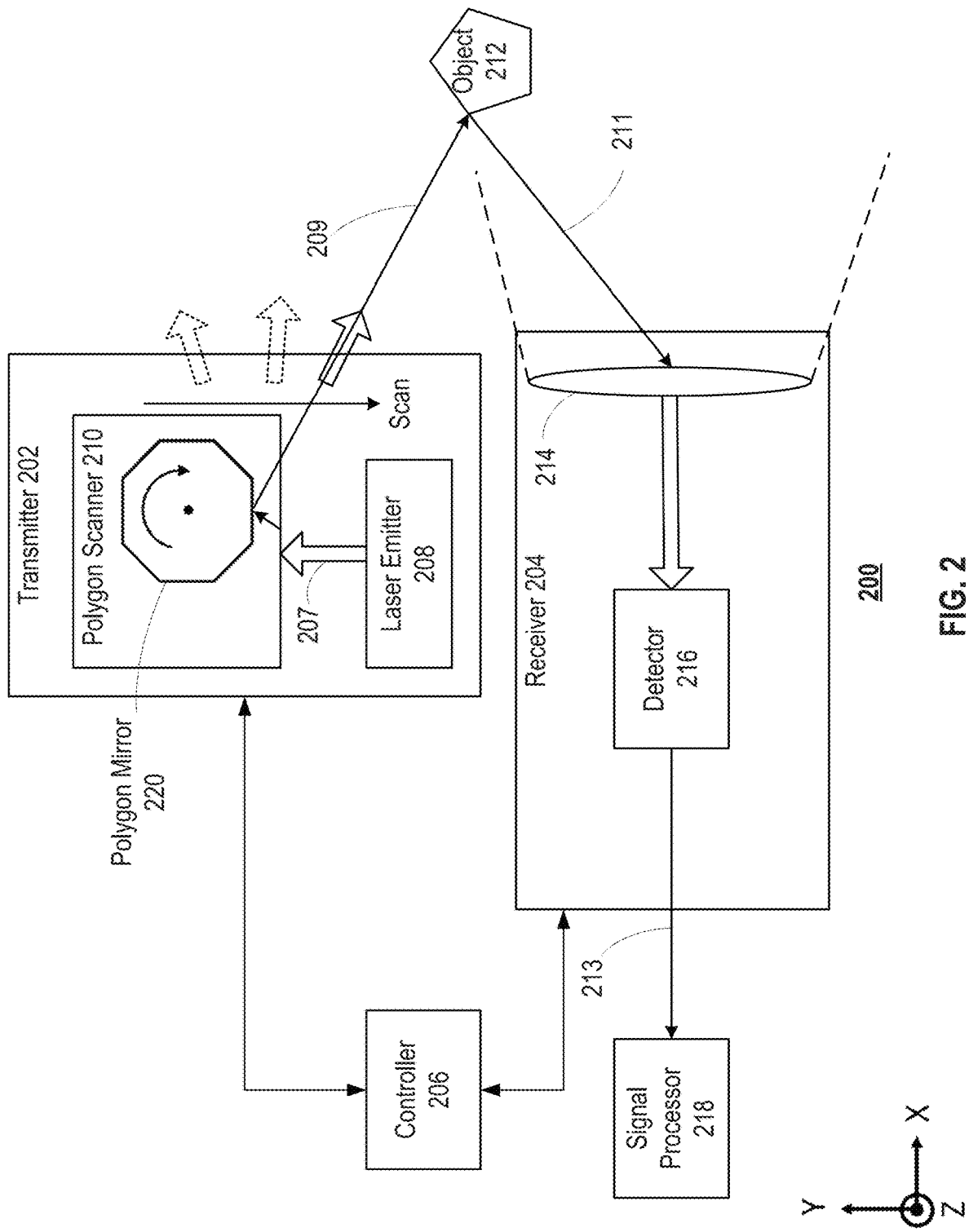
FIG. 2 illustrates a block diagram of an exemplary LiDAR system, according to embodiments of the disclosure.

FIG. 2 illustrates a block diagram of an exemplary LiDAR system 200, according to embodiments of the disclosure. LiDAR system 200 may include a transmitter 202, a receiver 204, a signal processor 218, and a controller 206 coupled to transmitter 202 and receiver 204. Transmitter 202 may further include a laser emitter 208 for emitting an optical signal and a polygon scanner 210 for steering the received optical signal from laser emitter 208 to an environment. Receiver 204 may further include a condenser lens 214 and a detector 216.

Transmitter 202 may emit optical beams (e.g., pulsed laser beams, continuous wave (CW) beams, frequency modulated continuous wave (FMCW) beams) along multiple directions. According to one example, transmitter 202 can sequentially emit a stream of pulsed laser beams in different directions within a scan range (e.g., a range in angular degrees), as illustrated in FIG. 2. Laser emitter 208 may be configured to provide laser beams 207 (also referred to as "native laser beam") to polygon scanner 210. In some embodiments of the present disclosure, laser emitter 208 may generate a pulsed laser beam in the ultraviolet, visible, or near infrared wavelength range.

In some embodiments of the present disclosure, laser emitter 208 may include a pulsed laser diode (PLD), a CW laser diode, a vertical-cavity surface-emitting laser (VC-SEL), a fiber laser, etc. For example, a PLD or a CW laser diode may be a semiconductor device similar to a light-emitting diode (LED) in which the laser beam is created at the diode's junction. Depending on the semiconductor materials of diodes in laser emitter 208, the wavelength of laser beams 207 provided by a PLD may be larger than 700 nm, such as 760 nm, 785 nm, 808 nm, 848 nm, 905 nm, 940 nm, 980 nm, 1064 nm, 1083 nm, 1310 nm, 1480 nm, 1512 nm, 1550 nm, 1625 nm, 1654 nm, 1877 nm, 1940 nm, 2000 nm, etc. It is understood that any suitable laser emitter may be used as laser emitter 208 for emitting laser beams 207 at a proper wavelength.

Polygon scanner 210 may be configured to emit laser beams 209 to an object 212 in a direction within a range of scanning angles. In some embodiments consistent with the present disclosure, polygon scanner 210 may include a rotational mirror (e.g., a polygon mirror 220) rotating continuously around an axis. For example, as shown in FIG. 2, polygon mirror 220 includes eight mirror surfaces that parallel to the rotation axis. When polygon mirror 220 rotates clockwise, at least one of these mirror surfaces may deflect laser beams 207 to the environment, which becomes laser beams 209. It is contemplated that the number of the mirror surfaces of polygon mirror 220 may be more or less than eight (e.g., five, six, seven, nine, ten, etc.), and the mirror surfaces are not necessarily parallel to the rotation axis.

As will be described below in greater detail, polygon scanner 210 may further include a magnetic sensing system (not shown). The magnetic sensing system may be configured to determine an actual angular position of polygon mirror 220 at any given time point, which can be used to provide feedback control to the scanning process. In some embodiments of the present disclosure, polygon scanner 210 may also include other optical components (e.g., lenses, mirrors) that can focus pulsed laser light into a narrow laser beam to increase the scan resolution and the range to scan object 212.

Object 212 may be made of a wide range of materials including, for example, non-metallic objects, rocks, rain, chemical compounds, aerosols, clouds and even single molecules. The wavelength of laser beams 209 may vary based on the composition of object 212. In some embodiments, at each time point during the scan, polygon scanner 210 may emit laser beams 209 to object 212 in a direction within a range of scanning angles by rotating polygon mirror 220. Upon contact, laser beams 209 may be reflected by object 212 via backscattering, such as Raman scattering, and fluorescence to form laser beams 211.

In some embodiments, receiver 204 may be configured to detect laser beams 211 returned from object 212. The returned laser beams 211 may be in a different direction from laser beams 209. Receiver 204 can collect laser beams returned from object 212 and output electrical signals reflecting the intensity of the returned laser beams. As illustrated in FIG. 2, receiver 204 may include lens 214 and detector 216. At each time point during the scan, lens 214 may be configured to collect light from a respective direction in its field of view (FOV) and converge the laser beams to focus before it is received on detector 216.

Detector 216 may be configured to detect laser beams passing through lens 214 and convert the detected laser beams into the output electrical signals. In some embodiments, detector 216 may convert the laser light (e.g., returned laser beams 211) collected by lens 214 into electrical signals 213 (e.g., current or voltage signals). Electrical signals 213 may be generated when photons are absorbed in a photodiode included in detector 216. In some embodiments of the present disclosure, detector 216 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 200 may also include one or more signal processor 218. Signal processor 218 may receive electrical signals 213 generated by detector 216. Signal processor 218 may process electrical signals 213 to determine, for example, distance information carried by electrical signals 213. Signal processor 218 may construct a point cloud based on the processed information. Signal processor 218 may include a microprocessor, a microcontroller, a central processing unit (CPU), a graphical processing unit (GPU), a digital signal processor (DSP), or other suitable data processing devices. In some embodiments, signal processor 218 may be part of controller 206.

LiDAR system 200 may further include one or more controllers, such as a controller 206. Controller 206 may control the operation of transmitter 202 and/or receiver 204 to perform detection/sensing operations. Controller 206 may include components (not shown) such as a communication interface, a processor, a memory, and a storage for performing various control functions. In some embodiments, controller 206 may have different modules in a single device, such as an integrated circuit (IC) chip (implemented as, for example, an application-specific integrated circuit (ASIC) or a field-programmable gate array (FPGA)), or separate devices with dedicated functions. In some embodiments, the processor may include any appropriate type of general-purpose or special-purpose microprocessor, digital signal processor, or microcontroller. The memory or storage may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. For example, the memory and/or the storage may be configured to store program(s) that may be executed by the processor to control the operation of polygon scanner 210.

In some embodiments, controller 206 may control a magnetic sensing system to sense a voltage caused by relative movement of a Hall sensor and a permanent magnet and determine the actual rotation angle of polygon mirror 220 in real-time based on the voltage generated by the Hall sensor. In some embodiments, controller 206 may send control signals to polygon scanner 210 to control the rotation of polygon mirror 220 based on the sensed rotation angle. For example, controller 206 may implement a feedback control loop to control polygon mirror 220 based on the real-time sensing.

Figure 3:
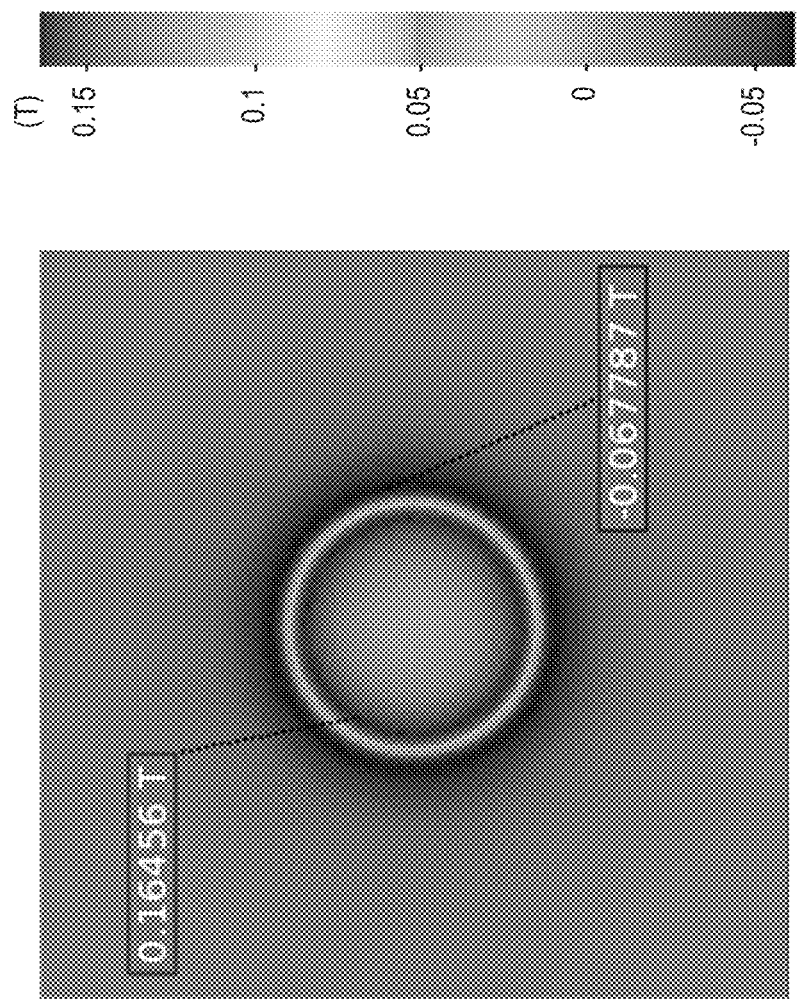
FIG. 3 illustrates an exemplary distribution of magnetic flux density in Z-axis direction near a disc permanent magnet, according to embodiments of the disclosure.

FIG. 3 illustrates an exemplary distribution of magnetic flux density in Z-axis direction near a disc permanent magnet, according to embodiments of the disclosure. The surface of the disc permanent magnet (not shown) is parallel to XY-plane. The strength of the magnetic field shown in FIG. 3 is measured at a distance of 1 mm above the surface of the disc permanent magnet. A radius of the exemplary disc permanent magnet is 1.5 mm. A highest magnetic flux density in Z-axis direction shown in FIG. 3 is 0.16456 tesla (T), and a lowest magnetic flux density in Z-axis direction is −0.067787 T (a minus sign means a negative Z-axis direction). As shown in FIG. 3, the magnetic field is centrosymmetrically distributed and the strength of magnetic field is a function of a distance to the center of the disc permanent magnet.

Figure 4:
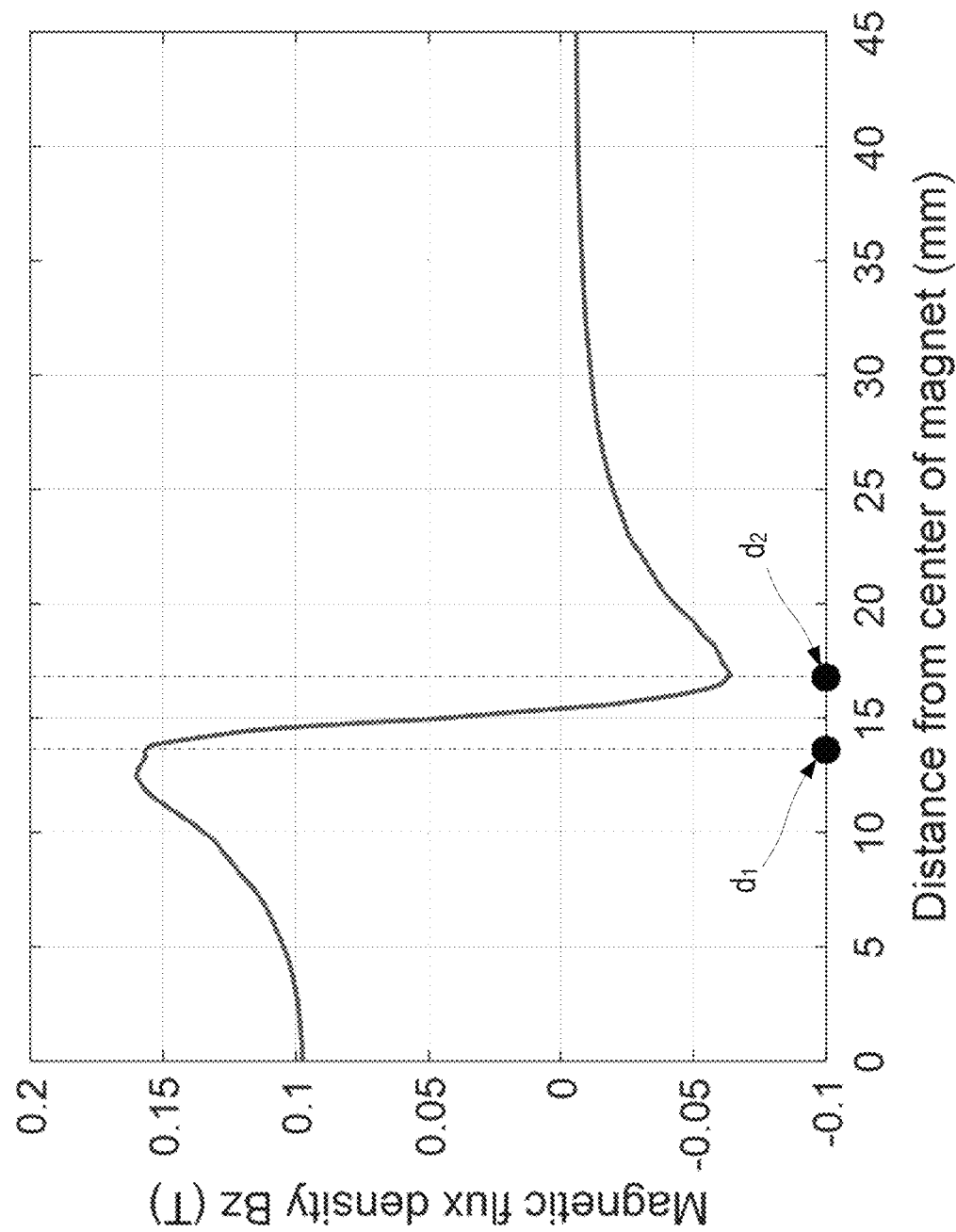
FIG. 4 illustrates a line diagram of an exemplary relationship between a distance to the center of the disc permanent magnet and the magnetic flux density in Z-axis direction of FIG. 3, according to embodiments of the disclosure.

For example, FIG. 4 illustrates a line diagram of an exemplary relationship between a distance to the center of the disc permanent magnet and the magnetic flux density in the Z-axis direction (Bz) of FIG. 3, according to embodiments of the disclosure. As shown in FIG. 4, the magnetic flux density Bz (T) is a function of the distance to the center of the disc permanent magnet and Bz monotonically decreases when the distance to the center of the disc permanent magnet increases from $d_1$ to $d_2$. In some embodiments, the magnetic flux density Bz can be measured using a Hall sensor in the disclosed magnetic sensing systems. The Hall sensor may generate a voltage proportional to the strength of the magnetic field (e.g., the magnetic flux density Bz). For example, when the distance from the Hall sensor to the center of the disc permanent magnet increases from $d_1$ to $d_2$, the voltage generated by the Hall sensor monotonically decreases.

Figure 5:
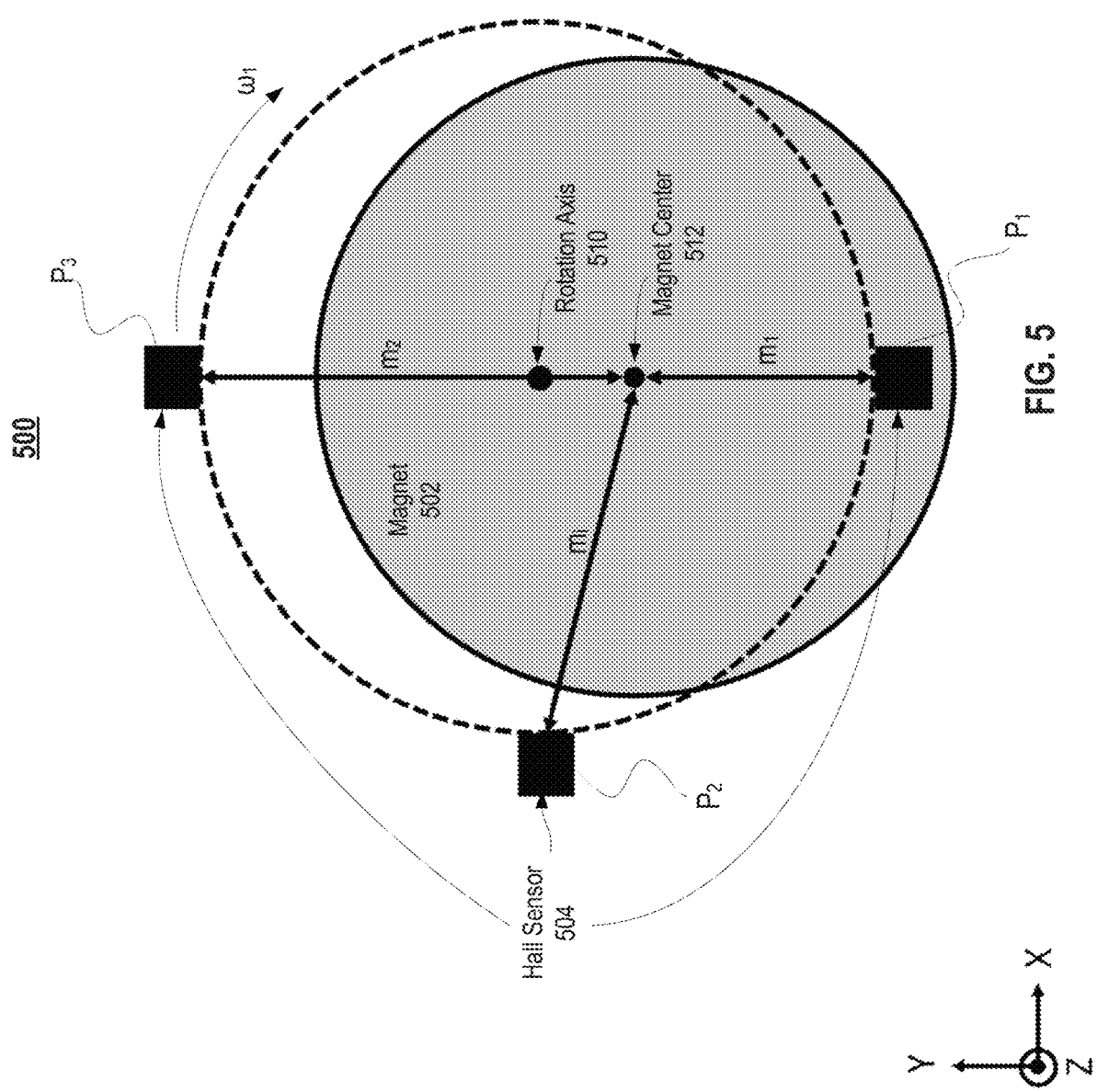
FIG. 5 illustrates a schematic diagram of an exemplary magnetic sensing system with a Hall sensor rotating along with a polygon mirror, according to some embodiments of the disclosure.

In some embodiments, the disc permanent magnet in the disclosed magnetic sensing system may be fixed on a substrate and the Hall sensor may be mounted on the polygon mirror. For example, FIG. 5 illustrates a schematic diagram of an exemplary magnetic sensing system 500 with a Hall sensor rotating along with a polygon mirror, according to some embodiments of the disclosure. When the disc permanent magnet is fixed on the substrate and does not rotate with the polygon mirror, the disclosed magnetic sensing system may be able to include a disc permanent magnet with a larger size to provide a stronger magnetic field. The stronger magnetic field may improve the signal-to-noise ratio in an output signal from the Hall sensor.

As shown in FIG. 5, magnetic sensing system 500 may include a disc permanent magnet 502 (hereafter also referred to as "magnet 502") and a Hall sensor 504. Magnet 502 (illustrated as a grey circle) is fixed on the substrate (not shown). Magnet center 512 is the center of magnet 502. The polygon mirror (not shown) rotates clockwise around a rotation axis 510 with an angular frequency Wi. Hall sensor 504 is fixed on the polygon mirror and rotates along with the polygon mirror around rotation axis 510 with angular frequency $\omega_1$ too. Consistent with some embodiments, Hall sensor 504 has an acentric location on the polygon mirror. For example, as shown in FIG. 5, Hall sensor 504 is not mounted on rotation axis 510. In some embodiments, Hall sensor 504 rotates is parallel to the surface of magnet 502. For example, the orientation of Hall sensor 504 is parallel to XY-plane and perpendicular to rotation axis 510 in order to detect the strength of the magnet field through Hall sensor 504 (e.g., magnetic flux density Bz).

As shown in FIG. 5, an orbit of Hall sensor 504 is illustrated in a dashed circle. In some embodiments, when Hall sensor 504 rotates to a position $P_1$ (e.g., a position nearest to magnet center 512 on the orbit), the strength of the magnet field through Hall sensor 504 (e.g., magnetic flux density Bz) reaches a highest value comparing to those strengths at other positions on the orbit. $m_1$ is a distance from position $P_1$ to magnet center 512, where $m_1 >= d_1$ in FIG. 4. When Hall sensor 504 rotates to a position $P_3$ (e.g., a position farthest to magnet center 512 on the orbit), the strength of the magnet field through Hall sensor 504 (e.g., magnetic flux density Bz) reaches a lowest value comparing to those strengths at other positions on the orbit. $m_2$ is a distance from position $P_3$ to magnet center 512, where $m_2 <= d_2$ in FIG. 4. When Hall sensor 504 rotates to a position other than positions $P_1$ and $P_3$ (e.g., position $P_2$) on the orbit, a distance $m_i$ from position $P_2$ to magnet center 512 may be longer than $m_1$ but shorter than $m_2$ (i.e., $m_1 < m_i < m_2$).

As shown in FIG. 5, position $P_1$, position $P_3$, magnet center 512, and rotation axis 510 are collinear. In some embodiments, a distance between rotation axis 510 and magnet center 512 can be calculated as $(m_2 - m_1)/2$. In some embodiments, a distance between rotation axis 510 and Hall sensor 504 can be calculated as $(m_2 + m_1)/2$. When Hall sensor 504 rotates from position $P_3$ to position $P_1$ clockwise (e.g., the rotation angle of the polygon mirror changes from 0 to 180 degrees), the distance from Hall sensor 504 to magnet center 512 decreases monotonically from $m_2$ to $m_1$ and the strength of the magnet field through Hall sensor 504 (e.g., magnetic flux density Bz) increases monotonically. When Hall sensor 504 rotates from $P_1$ to $P_3$ clockwise (e.g., the rotation angle of the polygon mirror changes from 180 degrees to 360 degrees), the distance from Hall sensor 504 to magnet center 512 increases monotonically from $m_1$ to $m_2$ and the strength of the magnet field through Hall sensor 504 (e.g., magnetic flux density Bz) decreases monotonically. In other words, a position of Hall sensor 504 (e.g., the rotation angle of the polygon mirror) at a given time point can be determined based on a value and a variation trend or rate of the strength of the magnet field through Hall sensor 504 (e.g., magnetic flux density Bz) at that time point.

Figure 6:
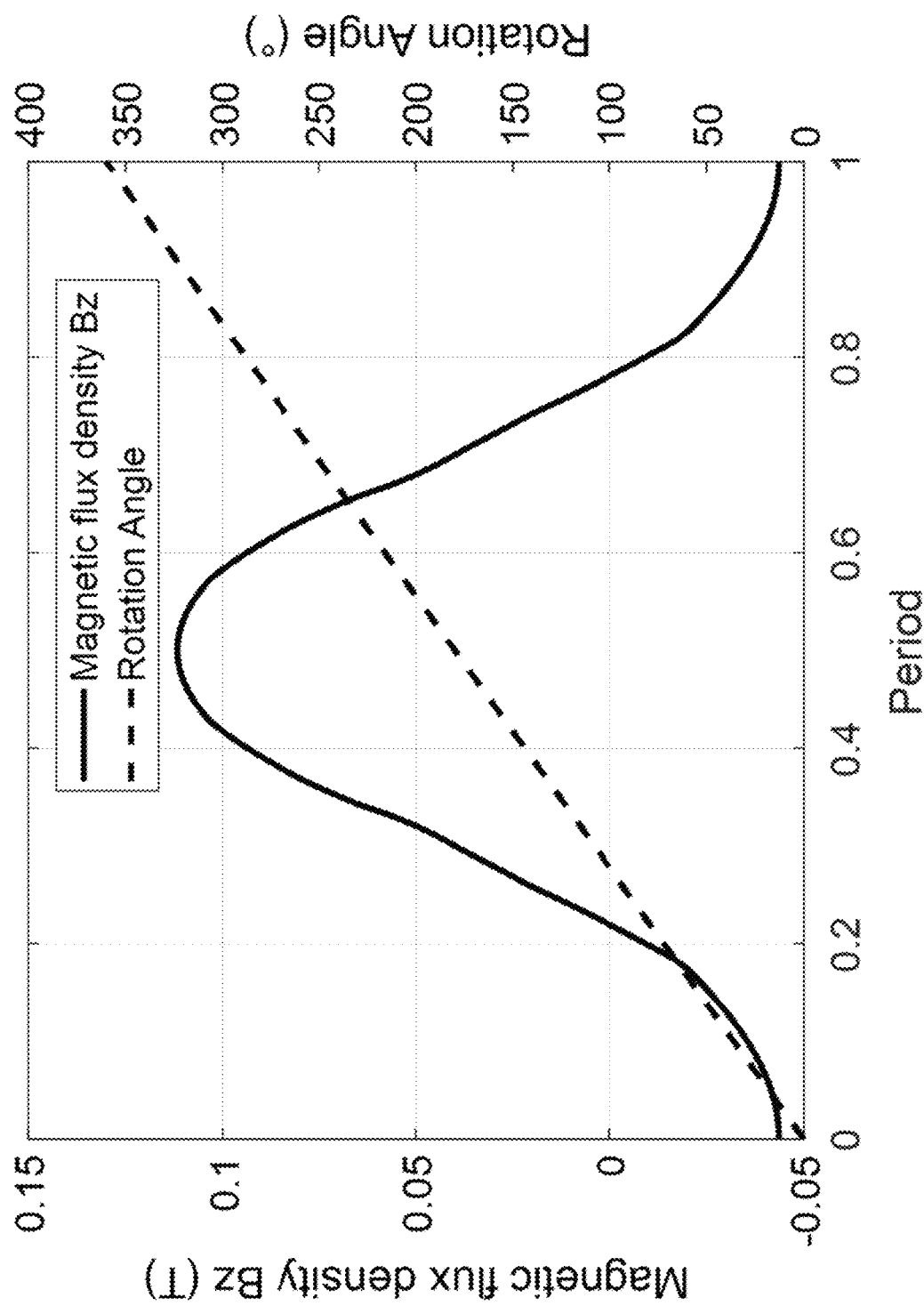
FIG. 6 illustrates a line diagram of an exemplary relationship between a magnetic flux density in a Z-axis direction and a rotation angle of a polygon mirror, according to embodiments of the disclosure.

FIG. 6 illustrates a line diagram of an exemplary relationship between a magnetic flux density Bz and a rotation angle of a polygon mirror, according to embodiments of the disclosure. As shown in FIG. 6, the magnetic flux density Bz monotonically increases in the first half of the rotation period (e.g., the rotation angle of the polygon mirror changes from 0 to 180 degrees). The magnetic flux density Bz monotonically decreases in the second half of the rotation period (e.g., the rotation angle of the polygon mirror changes from 180 degrees to 360 degrees). The rotation angle of the polygon mirror at a given time point (e.g., expressed as a percentage of the rotation period) thereby can be determined based on a combination of a value and a variation trend or rate of the magnetic flux density Bz.

In some alternative embodiments, the Hall sensor in the disclosed magnetic sensing system may be fixed on a substrate and the disc permanent magnet may be mounted on the polygon mirror. For example, FIGS. 7A-7C each illustrates a schematic diagram of another exemplary magnetic sensing system having a disc permanent magnet rotating along with a polygon mirror and a fixed Hall sensor, according to some embodiments of the disclosure. Because the Hall sensor may require a power supply to generate electrical signals, fixing the Hall sensor on the substrate may simplify a circuit design for the disclosed magnetic sensing system.

As shown in each of FIGS. 7A-7C, a disc permanent magnet 702 (illustrated in a solid-line circle) is mounted on a polygon mirror (not shown). The polygon mirror continuously rotates clockwise around a rotation axis 710 with an angular frequency $\omega_2$. As a result, disc permanent magnet 702 (hereafter also referred to as "magnet 702") rotates along with the polygon mirror around rotation axis 710 with angular frequency $\omega_2$ too. Magnet center 712 is the center of magnet 702 and does not locate on rotation axis 710. Magnet center 712 moves around rotation axis 710 on a circular orbit (illustrated in a dashed circle in each of FIGS. 7A-7C). Hall sensor 704 is mounted on the substrate (not shown). In some embodiments, magnet 702 rotates in a plane that is perpendicular to rotation axis 710. For example, as shown in each of FIGS. 7A-7C, rotation axis 710 is parallel to the Z-axis and magnet 702 rotates in a plane that is parallel to the XY-plane.

As shown in FIG. 7A, when magnet 702 rotates to a position $L_1$, a distance from Hall sensor 704 to magnet center 712 may equal $n_1$, where $n_1 >= d_1$ in FIG. 4 and $n_1$ is a shortest distance between Hall sensor 704 and magnet center 712 in a rotation period of the polygon mirror. At position $L_1$, the strength of the magnet field through Hall sensor 704 (e.g., magnetic flux density Bz) reaches a highest value comparing to those strengths at other positions on the orbit. When magnet 702 continuously rotates clockwise to a position $L_2$, for example as shown in FIG. 7B, the distance from Hall sensor 704 to magnet center 712 may equal $n_i$, where $n_i > n_1$. The strength of the magnet field through Hall sensor 704 (e.g., magnetic flux density Bz) at position $L_2$ is less than that at position $L_1$ based on the exemplary relationship between the distance to the center of the disc permanent magnet and magnetic flux density Bz shown in FIG. 3. As shown in FIG. 7C, when magnet 702 rotates to a position $L_3$, the distance from Hall sensor 704 to magnet center 712 may equal $n_2$, where $n_i < n_2 <= d_2$ in FIG. 4 and $n_2$ is a longest distance between Hall sensor 704 and magnet center 712 in the rotation period of the polygon mirror. At position $L_3$, the strength of the magnet field through Hall sensor 704 (e.g., magnetic flux density Bz) reaches a lowest value comparing to those strengths at other positions on the orbit.

In some embodiments, a distance between rotation axis 710 and magnet center 712 can be calculated as $(n_2-n_1)/2$. In some embodiments, a distance between rotation axis 710 and Hall sensor 704 can be calculated as $(n_2+n_1)/2$. When magnet 702 rotates along with the polygon mirror from position $L_3$ to position $L_1$ clockwise (e.g., the rotation angle of the polygon mirror changes from 0 to 180 degrees), the distance from Hall sensor 704 to magnet center 712 decreases monotonically from $n_2$ to $n_1$ and the strength of the magnet field through Hall sensor 704 (e.g., magnetic flux density Bz) increases monotonically. When magnet 702 rotates from $L_1$ to $L_3$ clockwise (e.g., the rotation angle of the polygon mirror changes from 180 degrees to 360 degrees), the distance from Hall sensor 704 to magnet center 712 increases monotonically from $n_1$ to $n_2$ and the strength of the magnet field through Hall sensor 704 (e.g., magnetic flux density Bz) decreases monotonically. In other words, a position of magnet 702 (e.g., the rotation angle of the polygon mirror) at any given time point can be determined based on a value and a variation trend or rate of the strength of the magnet field through Hall sensor 704 (e.g., magnetic flux density Bz) at that time point. In some embodiments, the rotation angle of the polygon mirror and the magnetic flux density Bz may have a similar relationship as shown in FIG. 6.

In some embodiments, the mapping between rotation angles and combinations of the values of the voltage and the variation trends or rates of the value of the strength of the magnetic field (e.g., magnetic flux density Bz) may be calculated offline and recorded in a look-up table. In some embodiments, the look-up table may be preprogramed in controller 206. Consistent with some embodiments, controller 206 may further provide a closed-loop feedback control to the polygon mirror based on the determined rotation angle of the polygon mirror using the look-up table.

Figure 8:
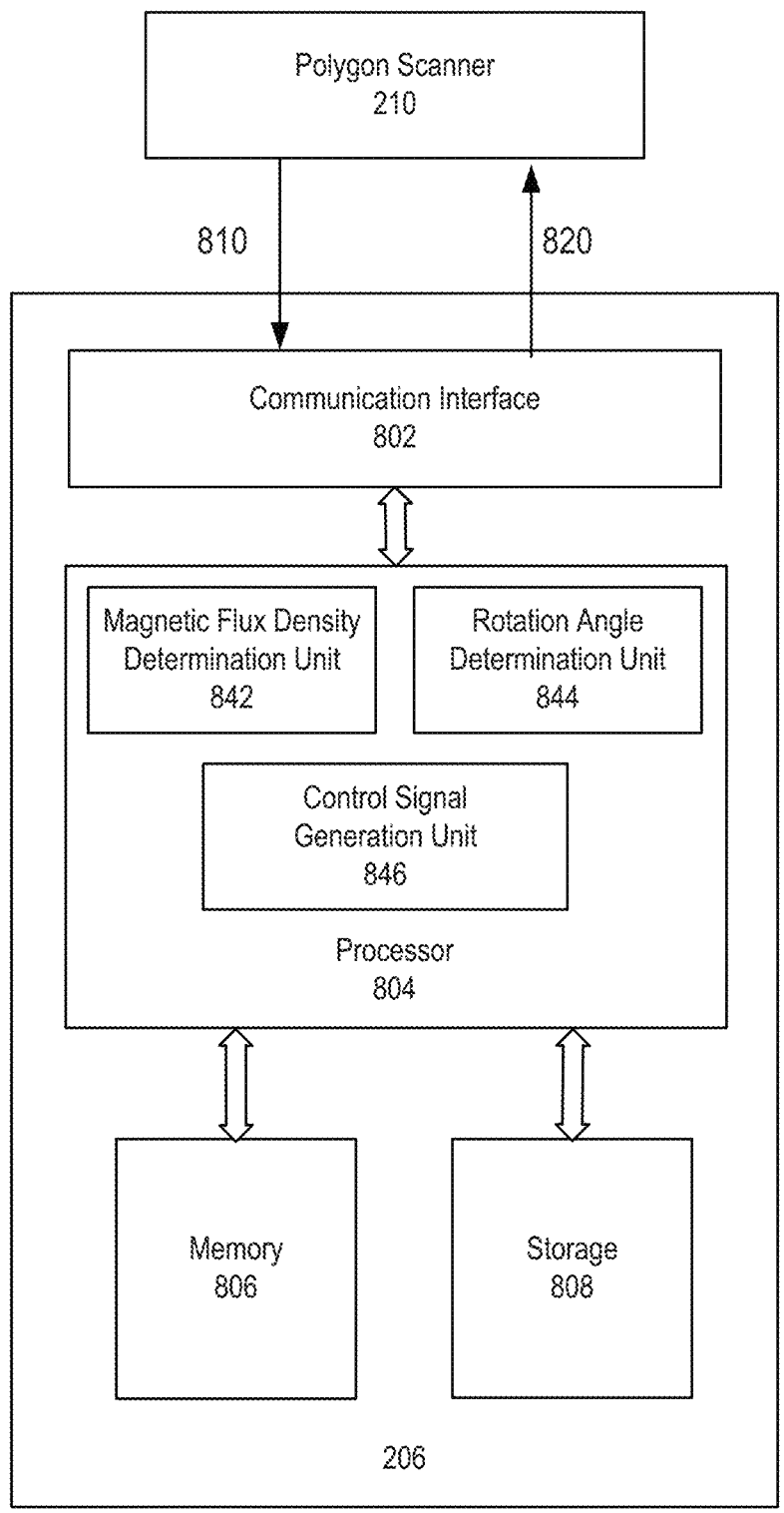
FIG. 8 illustrates a schematic diagram of an exemplary controller for determining a rotation angle of a polygon mirror, according to embodiments of the disclosure.

For example, FIG. 8 illustrates a block diagram of an exemplary controller 206 for determining a rotation angle of a polygon mirror (e.g., polygon mirror 220), according to embodiments of the disclosure. Consistent with the present disclosure, controller 206 may be configured to receive and process the voltage signal from the Hall sensor in the magnetic sensing system. Controller 206 may further be configured to determine an angular position (e.g., rotation angle) of the polygon mirror based on the processed voltage at a given time point. Controller 206 may also be configured to generate a control signal based on the determined rotation angle for feedback control of the polygon mirror via the motors.

In some embodiments, as shown in FIG. 8, controller 206 may include a communication interface 802, a processor 804, a memory 806, and a storage 808. In some embodiments, controller 206 may have different modules in a single device, such as an integrated circuit (IC) chip implemented as an application-specific integrated circuit (ASIC) or a field-programmable gate array (FPGA), or separate devices with dedicated functions. Components of controller 206 may be in an integrated device, or distributed at different locations but communicate with each other through a network (not shown). For example, processor 804 may be a processor on-board LiDAR system 200, a processor inside a stand-alone computing, or a cloud processor, or any combinations thereof.

Communication interface 802 may send data to and receive data from components such as transmitter 202/receiver 204 via communication cables, a Wireless Local Area Network (WLAN), a Wide Area Network (WAN), wireless networks such as radio waves, a nationwide cellular network, and/or a local wireless network (e.g., Bluetooth™ or WiFi), or other communication methods. In some embodiments, communication interface 802 can be an integrated services digital network (ISDN) card, cable modem, satellite modem, or a modem to provide a data communication connection. As another example, communication interface 802 can be a local area network (LAN) card to provide a data communication connection to a compatible LAN. Wireless links can also be implemented by communication interface 802. In such an implementation, communication interface 802 can send and receive electrical, electromagnetic or optical signals that carry digital data streams representing various types of information via a network.

Processor 804 may include any appropriate type of general-purpose or special-purpose microprocessor, digital signal processor, or microcontroller. Processor 804 may be configured as a separate processor module dedicated to detecting a rotation angle of the polygon mirror (e.g., polygon mirror 220) at any given time point and adaptively controlling the rotation of the polygon mirror based on the detected rotation angle. Alternatively, processor 804 may be configured as a shared processor module for performing other functions such as controlling transmitter 202/receiver 204.

As shown in FIG. 8, processor 804 may include multiple modules, such as a magnetic flux density determination unit 842, a rotation angle determination unit 844, a control signal generation unit 846, and the like. These modules (and any corresponding sub-modules or sub-units) can be hardware units (e.g., portions of an integrated circuit) of processor 804 designed for use with other components or to execute a part of a program. The program may be stored on a computer-readable medium, and when executed by processor 804, it may perform one or more functions. Although FIG. 8 shows units 842-846 all within one processor 804, it is contemplated that these units may be distributed among multiple processors located near or remotely with each other.

In some embodiments, magnetic flux density determination unit 842 may be configured to receive an electrical signal 810 (e.g., a voltage signal) from polygon scanner 210 (e.g., from the Hall sensor of the magnetic sensing system). Consistent with some embodiments, because electrical signal 810 generated by the Hall sensor (e.g., Hall sensors 504 or 704) is proportional to the strength of the magnetic field (e.g., magnetic flux density Bz) through the Hall sensor, the magnetic flux density through the Hall sensor at any given time point can be determined based on the received electrical signal from polygon scanner 210. It is contemplated that magnetic flux density determination unit 842 of controller 206 may use any suitable approaches to determine the magnetic flux density based on electrical signal 810 at any given time point. For example, a look-up table can be pre-computed to map the electrical signals to the magnetic flux densities.

In some embodiments, rotation angle determination unit 844 may be configured to determine the rotation angle of the polygon mirror (e.g., polygon mirror 220) based on the determined magnetic flux density (e.g., magnetic flux density Bz) determined by magnetic flux density determination unit 842. In some embodiments, a look-up table may be used to map each combination of the value of the magnetic flux density and the variation trend or rate of the value of the magnetic flux density to one of rotation angles of the polygon mirror. In one example, the look-up table may be pre-computed and stored in memory 806/storage 808 of controller 206 and retrieved by rotation angle determination unit 844. In another example, the look-up table may be stored and updated in a remote location and retrieved by controller 206 via communication interface 802 as needed. It is contemplated that rotation angle determination unit 844 of controller 206 may use any other suitable approach to determine the rotation angle based on electrical signal 810 at any given time point.

In some embodiments, control signal generation unit 846 may be configured to generate control signals in order to provide a closed-loop feedback control to polygon mirror 220, e.g., by sending the control signals (e.g., a control signal 820) to the motor of the polygon mirror. For example, controller 206 may compare the sensed rotation angle with a target rotation angle of polygon mirror 220 at a corresponding time point. Consistent with some embodiments, the actual rotation angle is determined by rotation angle determination unit 844 based on the magnetic flux density through the Hall sensor at the sensing time point. The target rotation angle is an intended rotation angle of polygon mirror 220 at the same time point. If the determined rotation angle is smaller than the intended angle, controller 206 may send a control signal to the motor of polygon mirror 220 to increase the speed of polygon mirror 220. Otherwise, if the determined rotation angle is larger than the intended angle at the sensing time point, controller 206 may send a control signal to the motor to slow down polygon mirror 220. Using the closed-loop control based on a real-time sensing of the rotation angle, polygon mirror 220 may be adjusted to a target angle that is intended.

Memory 806 and storage 808 may include any appropriate type of mass storage provided to store any type of information that processor 804 may need to operate. Memory 806 and storage 808 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 806 and/or storage 808 may be configured to store one or more computer programs that may be executed by processor 804 to perform functions disclosed herein. For example, memory 806 and/or storage 808 may be configured to store program(s) that may be executed by processor 804 for adaptive control of the rotation of polygon mirror 220 in real-time.

Memory 806 and/or storage 808 may be further configured to store information and data used by processor 804. For instance, memory 806 and/or storage 808 may be configured to store the look-up table that maps the values of the magnetic flux density and the variation trends or rates of the value of the magnetic flux density to the rotation angles of the polygon mirror. In some embodiments, memory 806 and/or storage 808 may also store intermediate data such as determined magnetic flux densities, determined rotation angles, comparison results of each pair of the determined rotation angle and the target rotation angle, etc. The various types of data may be stored permanently, removed periodically, or disregarded immediately after each scan.

Figure 9:
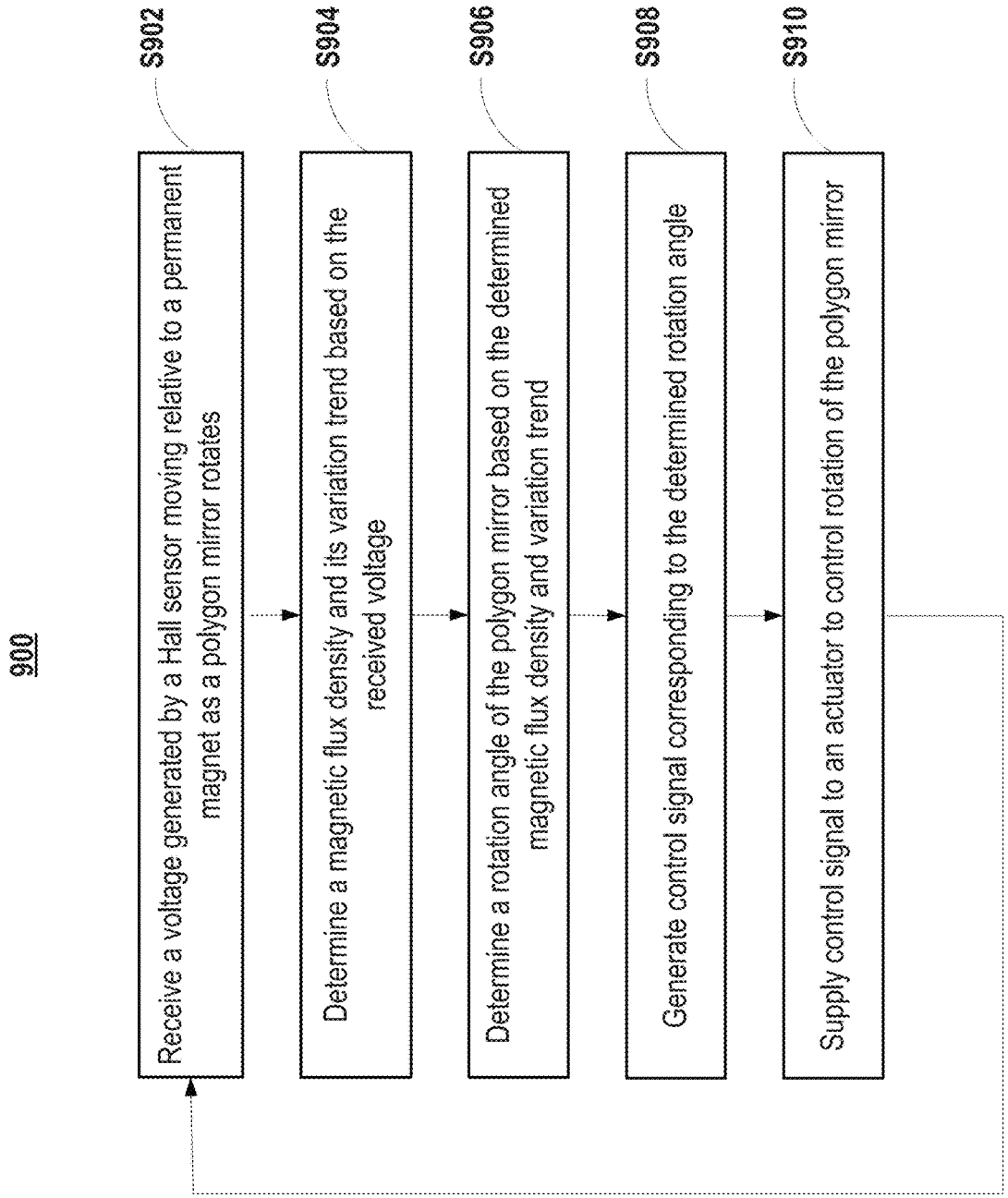
FIG. 9 illustrates a flow chart of an exemplary magnetic sensing method for a polygon mirror, according to embodiments of the disclosure.

FIG. 9 illustrates a flow chart of an exemplary magnetic sensing method 900 for a polygon mirror, according to embodiments of the disclosure. For example, method 900 may be implemented by magnetic sensing system 500 of FIG. 5 along with controller 206. However, method 900 is not limited to that exemplary embodiment. Method 900 may include steps S902-S910 as described below. It is to be appreciated that some of the steps may be optional to perform the disclosure provided herein. Further, some of the steps may be performed simultaneously, or in a different order than shown in FIG. 9.

In step S902, a voltage signal (e.g., electrical signal 810) is received by a processor (e.g., processor 804) of a controller (e.g., controller 206) from a magnetic sensing system (e.g., magnetic sensing system 500) at a current time point. The voltage is generated by a Hall sensor (e.g., Hall sensors 504 or 704) that moves relative to a disc permanent magnet (e.g., magnets 502 or 702) when a polygon mirror rotates (e.g., polygon mirror 220). Consistent with some embodiments, one of the Hall sensor and the disc permanent magnet locates on the polygon mirror and the other locates off the polygon mirror. In some embodiments, the voltage signal may be sensed and sent to the controller when the polygon mirror rotates to a new angular position. For example, controller 206 may receive a voltage signal (e.g., electrical signal 810) when polygon mirror 220 reaches a new rotation angle. In other words, the voltage signal is sensed upon actual knowledge that the rotation angle has changed. In some alternative embodiments, controller 206 may receive electrical signals periodically without knowing that the rotation angle of polygon mirror 220 has changed.

In step S904, the received voltage signal (e.g., electrical signal 810) may be used by the processor (e.g., processor 804) of the controller (e.g., controller 206) to determine a magnetic flux density (e.g., a value and a variation trend or rate) through the Hall sensor at the sensed time point. Consistent with some embodiments, the intensity of the received voltage signal is proportional to the strength of the magnetic field (e.g., magnetic flux density Bz) through the Hall sensor. In some embodiments, the magnetic flux density may be determined based on the intensity of the received voltage signal using a pre-computed look-up table. For example, the look-up table may include a mapping between voltage values and magnetic flux densities (e.g., values and variation trends or rates).

In step S906, the processor of the controller may determine the rotation angle of the polygon mirror based on the determined magnetic flux density at current time point. For example, processor 804 of controller 206 can determine the rotation angle of polygon mirror 220 based on the determined magnetic flux density using a look-up table. For example, processor 804 may determine the rotation angle of polygon mirror 220 using the look-up table to map the determined magnetic flux density (e.g., the value of the magnetic flux density and the variation trend or rate of the value of the magnetic flux density) to one of the rotation angles of polygon mirror 220.

In step S908, the processor of the controller can generate a control signal based on the determined rotation angle of the polygon mirror. For example, processor 804 of controller 206 may compare the determined rotation angle of the polygon mirror with a target angle at the current time point. If the determined rotation angle is smaller than the target angle at the current time point, processor 804 may generate a control signal to speed up the rotation of the polygon mirror. If the determined rotation angle is larger than the target angle at current time point, processor 804 may generate a control signal to slow down the rotation of the polygon mirror.

In step S910, the processor of the controller can supply the generated control signal to a motor of the polygon mirror to control rotation of the polygon mirror. For example, processor 804 can change a rotation speed/rate of polygon mirror 220 by sending the control signal to control the motor of polygon mirror 220. The motor of polygon mirror 220 may adjust the rotation speed of polygon mirror 220 based on the received control signal from processor 804 of controller 206. After supplying the generated control signal to the motor of the polygon mirror, the processor of the controller may determine the next rotation angle of the polygon mirror and provide feedback control the rotation of the polygon mirror for the next time point by repeating steps S902-S910.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A magnetic sensing system for a polygon mirror, comprising:
   a disc permanent magnet configured to provide a magnetic field;
   a Hall sensor configured to generate a voltage proportional to the strength of the magnetic field as the Hall sensor and the disc permanent magnet move relatively to each other when the polygon mirror rotates, wherein one of the disc permanent magnet and the Hall sensor locates on and rotates with the polygon mirror and the other locates off the polygon mirror, wherein the Hall sensor and the disc permanent magnet are placed such that a distance between the Hall sensor and the center of the disc permanent magnet changes, as they move relatively to each other; and
   at least one controller configured to determine a rotation angle of the polygon mirror based on the generated voltage by the Hall Sensor.

2. The magnetic sensing system of claim 1, wherein when the Hall sensor and the disc permanent magnet move relatively to each other, the distance between the Hall sensor and the center of the disc permanent magnet changes within a predetermined range between a first predetermined distance and a second predetermined distance.

3. The magnetic sensing system of claim 2, wherein the strength of the magnetic field at the Hall sensor changes monotonically when the distance between the Hall sensor and the center of the disc permanent magnet changes monotonically between the first predetermined distance and the second predetermined distance.

4. The magnetic sensing system of claim 1, wherein the Hall sensor is fixed on a substrate off the polygon mirror and the disc permanent magnet is mounted on the polygon mirror.

5. The magnetic sensing system of claim 4, wherein the center of the disc permanent magnet moves around a rotation axis of the polygon mirror in a circular orbit when the polygon mirror rotates.

6. The magnetic sensing system of claim 1, wherein the disc permanent magnet is fixed on a substrate off the polygon mirror and the Hall sensor is mounted on the polygon mirror.

7. The magnetic sensing system of claim 6, wherein the center of the disc permanent magnet is not on the rotation axis of the polygon mirror.

8. The magnetic sensing system of claim 6, wherein the Hall sensor is parallel to the surface of the disc permanent magnet.

9. The magnetic sensing system of claim 1, wherein to determine a rotation angle of the polygon mirror based on the generated voltage by the Hall sensor, the at least one controller is further configured to:
   determine a value of a magnetic flux density at a time point based on the generated voltage at the time point; and
   determine a variation trend or rate of the value of the magnetic flux density at the time point.

10. The magnetic sensing system of claim 9, wherein to determine a rotation angle of the polygon mirror based on the generated voltage by the Hall sensor, the at least one controller is further configured to:
    determine the rotation angle of the polygon mirror at the time point based on a combination of the value and variation trend or rate of the magnetic flux density at the time point using a predetermined look-up table that maps the respective values of the magnetic flux density and the variation trends or rates of the value of the magnetic flux density to rotation angles of the polygon mirror.

11. The magnetic sensing system of claim 1, wherein the at least one controller is further configured to adaptively control the rotation of the polygon mirror based on the determined rotation angle.

12. The magnetic sensing system of claim 11, wherein to adaptively control the rotation of the polygon mirror based on the determined rotation angle, the at least one controller is further configured to:
- compare the determined rotation angle with a target rotation angle; and
- supply a control signal to an actuator of the polygon mirror to speed up or slow down the rotation of the polygon mirror based on the comparison.

13. A magnetic sensing method for a polygon mirror, comprising:
- moving a disc permanent magnet and a Hall sensor relative to each other as the polygon mirror rotates, wherein one of the disc permanent magnet and the Hall sensor locates on and rotates with the polygon mirror and the other locates off the polygon mirror, wherein the Hall sensor and the disc permanent magnet are placed such that a distance between the Hall sensor and the center of the disc permanent magnet changes, as they move relatively to each other;
- measuring a voltage generated by the Hall sensor caused by the relative movement; and
- determining, by at least one controller, a rotation angle of the polygon mirror based on the voltage generated by the Hall sensor.

14. The magnetic sensing method of claim 13, wherein when the Hall sensor and the disc permanent magnet move relatively to each other, the distance between the Hall sensor and the center of the disc permanent magnet changes within a predetermined range between a first predetermined distance and a second predetermined distance.

15. The magnetic sensing method of claim 14, wherein the strength of a magnetic field at the Hall sensor changes monotonically when the distance between the Hall sensor and the center of the disc permanent magnet changes monotonically between the first predetermined distance and the second predetermined distance.

16. The magnetic sensing method of claim 15, wherein determining, by at least one controller, a rotation angle of the polygon mirror based on the voltage generated by the Hall sensor further comprises:
- determining a value of a magnetic flux density at a time point based on the voltage measured at the time point; and
- determining a variation trend or rate of the value of the magnetic flux density at the time point.

17. The magnetic sensing method of claim 16, wherein determining, by at least one controller, a rotation angle of the polygon mirror based on the voltage generated by the Hall sensor further comprises:
- determining the rotation angle of the polygon mirror at the time point based on a combination of the value and variation trend or rate of the magnetic flux density at the time point using a predetermined look-up table that maps the respective values of the magnetic flux density and the variation trends or rates of the value of the magnetic flux density to rotation angles of the polygon mirror.

18. The magnetic sensing method of claim 14, further comprising adaptively controlling the rotation of the polygon mirror, by the at least one controller, based on the determined rotation angle.

19. A polygon scanner assembly, comprising:
- a polygon mirror configured to rotate around a rotation axis;
- a disc permanent magnet configured to provide a magnetic field; and
- a Hall sensor configured to generate a voltage proportional to the strength of the magnetic field as the Hall sensor and the disc permanent magnet move relatively to each other when the polygon mirror rotates, wherein one of the disc permanent magnet and the Hall sensor locates on and rotates with the polygon mirror and the other locates off the polygon mirror, wherein the Hall sensor and the disc permanent magnet are placed such that a distance between the Hall sensor and the center of the disc permanent magnet changes, as they move relatively to each other.

20. The polygon scanner assembly of claim 19, wherein when the Hall sensor and the disc permanent magnet move relatively to each other, the distance between the Hall sensor and the center of the disc permanent magnet changes within a predetermined range between a first predetermined distance and a second predetermined distance, wherein the strength of the magnetic field at the Hall sensor changes monotonically when the distance between the Hall sensor and the center of the disc permanent magnet changes monotonically between the first predetermined distance and the second predetermined distance.

* * * * *